United States Patent
Miao et al.

(10) Patent No.: US 9,525,741 B2
(45) Date of Patent: Dec. 20, 2016

(54) METHOD AND SYSTEM FOR QOS BEARER RESOURCE CONTROL DURING ACCESS NEGOTIATION AND RELEASE

(71) Applicant: ZTE Corporation, Shenzhen, Guangdong (CN)

(72) Inventors: Yongsheng Miao, Shenzhen (CN); Li Zhang, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 137 days.

(21) Appl. No.: 14/430,237

(22) PCT Filed: Sep. 23, 2013

(86) PCT No.: PCT/CN2013/084023
§ 371 (c)(1),
(2) Date: Mar. 23, 2015

(87) PCT Pub. No.: WO2014/044224
PCT Pub. Date: Mar. 27, 2014

(65) Prior Publication Data
US 2015/0237144 A1    Aug. 20, 2015

(30) Foreign Application Priority Data
Sep. 24, 2012   (CN) .......................... 2012 1 0358260

(51) Int. Cl.
*G06F 15/177*   (2006.01)
*G06F 15/16*    (2006.01)
(Continued)

(52) U.S. Cl.
CPC .............. *H04L 67/14* (2013.01); *H04L 47/24* (2013.01)

(58) Field of Classification Search
CPC .................................. H04L 67/14; H04L 47/24
(Continued)

(56) References Cited

U.S. PATENT DOCUMENTS 7,680,481 B2 * 3/2010 Ejzak ................... H04M 15/00
370/328
8,135,124 B2 * 3/2012 Ramanathan ..... H04M 3/42042
379/211.01
(Continued)

FOREIGN PATENT DOCUMENTS

CN          1756256 A      4/2006
CN        101127940 A      2/2008
(Continued)

OTHER PUBLICATIONS

Supplementary European Search Report in European application No. 13839680.9, mailed on Aug. 21, 2015.
(Continued)

*Primary Examiner* — Melvin H Pollack
(74) *Attorney, Agent, or Firm* — Oppedahl Patent Law Firm LLC (57) ABSTRACT

A method and system for Quality of Service (QoS) during access negotiation are provided, which include that during media resource access negotiation, a calling side network element receives an INVITE 200 OK message from a called side terminal, detects that this call is under a SIP Forking scenario, only updates media resources negotiated by current session branch associated with the called side terminal, and does not process resource bearers negotiated by other session branches. A method and system for QoS bearer resource control during release is also provided, which include that during media resource release, a calling side network element receives a BYE message, and when detecting that this call is under an SIP Forking scenario, only releases media resources negotiated by current session
(Continued)

branch, and does not process resource bearers negotiated by other session branches. By the disclosure, a resource bearer requirement of the SIP Forking scenario can be met.

16 Claims, 6 Drawing Sheets (51) Int. Cl.
*H04L 29/08* (2006.01)
*H04L 12/851* (2013.01)
*G06F 15/173* (2006.01)

(58) Field of Classification Search
USPC .......................................................... 709/228
See application file for complete search history.

(56) References Cited

U.S. PATENT DOCUMENTS

| | | | | | |
|---|---|---|---|---|---|
| 8,170,590 | B2* | 5/2012 | Wang | ...................... | H04W 4/12 370/338 |
| 8,194,555 | B2* | 6/2012 | Morrill | ............... | H04L 41/0896 370/230.1 |
| 8,200,754 | B1* | 6/2012 | Armstrong | ............ | H04M 3/523 379/88.13 |
| 8,229,468 | B1* | 7/2012 | Robinson | ................ | H04L 43/10 455/400 |
| 8,392,581 | B2* | 3/2013 | Ait-Ameur | ......... | H04L 65/1016 370/225 |
| 8,472,431 | B2* | 6/2013 | Siegel | ................. | H04L 65/1016 370/352 |
| 8,520,663 | B2* | 8/2013 | Ku | ...................... | H04L 65/1069 370/352 |
| 8,521,889 | B2* | 8/2013 | Anschutz | .............. | H04L 47/785 370/241 |
| 8,606,893 | B2* | 12/2013 | Sanchez Santisto | ... | H04L 12/14 709/222 |
| 8,612,609 | B2* | 12/2013 | Mang | .................. | H04L 47/2458 370/401 |
| 8,619,596 | B2* | 12/2013 | Wiley | ................... | H04L 67/141 370/229 |
| 8,737,387 | B2* | 5/2014 | Tanabe | ................... | H04L 12/66 370/235 |
| 8,750,291 | B2* | 6/2014 | Balasaygun | .......... | H04M 15/00 370/352 |
| 8,769,113 | B2* | 7/2014 | Castro Castro | ......... | H04L 12/14 709/227 |
| 8,898,317 | B1* | 11/2014 | Armstrong | .......... | H04L 65/1006 709/228 |
| 8,948,752 | B2* | 2/2015 | Siegel | ................... | H04W 12/06 455/415 |
| 9,037,732 | B2* | 5/2015 | Zhu | ..................... | H04L 65/1069 370/310 |
| 9,246,950 | B2* | 1/2016 | Siegel | ................. | H04L 65/1016 |
| 9,253,219 | B2* | 2/2016 | Ross | ................... | H04L 65/1069 |
| 9,277,522 | B2* | 3/2016 | Suryavanshi | ......... | H04W 60/00 |
| 9,288,276 | B2* | 3/2016 | Adamczyk | .......... | H04L 12/5815 |
| 9,392,028 | B2* | 7/2016 | George | .................... | H04L 67/14 |
| 9,401,934 | B2* | 7/2016 | Sylvain | ............... | H04L 63/0892 |
| 2006/0004924 | A1* | 1/2006 | Trossen | .................. | H04L 67/16 709/228 |
| 2007/0291743 | A1* | 12/2007 | Froment | ........... | H04L 29/06027 370/352 |
| 2008/0032695 | A1* | 2/2008 | Zhu | ................... | H04W 36/0022 455/442 |
| 2008/0046573 | A1 | 2/2008 | Ropolyi | | |
| 2008/0240375 | A1 | 10/2008 | Chen | | |
| 2009/0125631 | A1* | 5/2009 | Blom | .................. | H04L 41/5003 709/228 |
| 2010/0054239 | A1 | 3/2010 | Torres | | |
| 2011/0040883 | A1 | 2/2011 | Belling | | |
| 2011/0116492 | A1* | 5/2011 | Byron | .................. | H04M 3/42221 370/352 |
| 2012/0166652 | A1* | 6/2012 | Bouthemy | .......... | H04L 65/1016 709/227 |
| 2012/0166659 | A1* | 6/2012 | Hjelm | ................... | H04L 47/781 709/228 |
| 2013/0097333 | A1* | 4/2013 | Bathurst | .......... | H04L 29/06027 709/231 |
| 2014/0181312 | A1* | 6/2014 | Rutten | ................ | H04L 65/1016 709/227 |

FOREIGN PATENT DOCUMENTS

| | | |
|---|---|---|
| EP | 1798947 A1 | 6/2007 |
| WO | 2009097032 A1 | 8/2009 |

OTHER PUBLICATIONS

Policy and Charging Control over Rx reference point (Release 11), mailed on Sep. 21, 2012.
Policy and Charging Control signalling flows and Quality of Service (QoS) parameter mapping (Release 11), mailed on Sep. 18, 2012.
International Search Report in international application No. PCT/CN2013/084023, mailed on Dec. 26, 2013.
English Translation of the Written Opinion of the International Search Authority in international application No. PCT/CN2013/084023, mailed on Dec. 26, 2013.

* cited by examiner

METHOD AND SYSTEM FOR QOS BEARER RESOURCE CONTROL DURING ACCESS NEGOTIATION AND RELEASE

RELATED APPLICATIONS

This application is a 35 U.S.C. 371 national stage filing from International Application No. PCT/CN2013/084023, filed Sep. 23, 2013, and claims priority to Chinese Application No. 201210358260.7, filed Sep. 24, 2012, the teachings of which are incorporated herein by reference.

TECHNICAL FIELD

The disclosure relates to a resource control technology in the field of communications, in particular to a method and system for Quality of Service (QoS) bearer resource control by a calling Proxy Call Session Control Function (P-CSCF) in an access negotiation or release process when a called user in an Internet Protocol (IP) Multimedia Subsystem (IMS) is under a Session Initiation Protocol (SIP) Forking scenario.

BACKGROUND

In a conventional Public Switched Telephone Network (PSTN), great attention is paid to QoS all the time; a conventional transport service is relatively undiversified, and an operation region of the network is also relatively undiversified, therefore, it is only necessary to ensure the QoS of a transport layer. A code flow transported in a Next Generation Network (NGN) may be low-speed and long-delay non-real-time data, or may be a high-speed and low-delay multimedia flow, or coexistence of these real-time and non-real-time data flows. The data flows of different media have stricter requirements on peer-to-peer QoS in the NGN.

Figure 1:
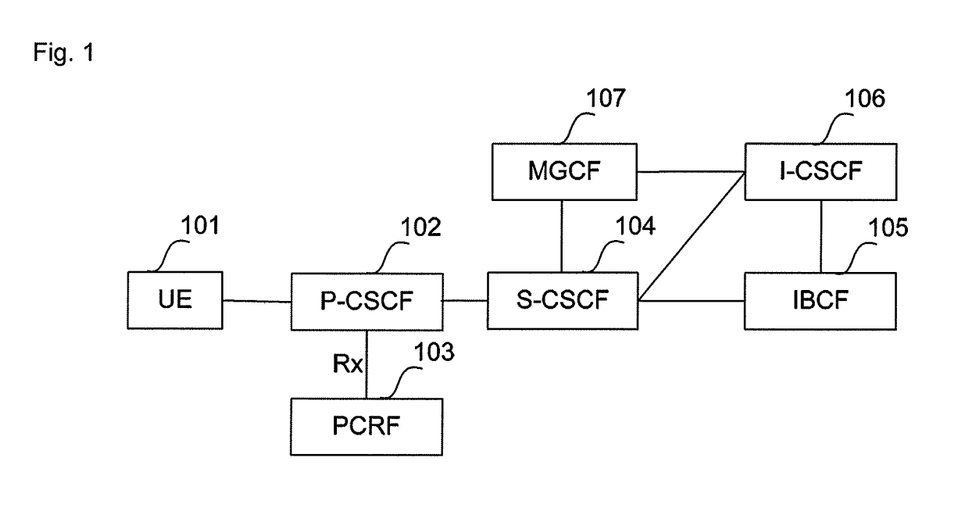
FIG. 1 is an architecture diagram of a system for implementing QoS control in a conventional IMS.

An IMS, as an important evolution of the NGN, provides guarantee for the QoS of the network. FIG. 1 is a reference frame of QoS control in an IMS, wherein an Rx interface is a standard interface between a P-CSCF and a Policy and Charging Rule Function (PCRF). The whole framework includes User Equipment (UE) 101, a P-CSCF 102, a PCRF 103 and a Serving Call Session Control Function (S-CSCF) 104, and in addition, functional entities such as an Interconnection Border Control Function (IBCF) 105, an Interrogating Call Session Control Function (I-CSCF) 106 and a Media Gateway Control Function (MGCF) 107 are also involved in a session process.

According to a description of 3rd-Generation Partnership Project (3GPP) standard protocol TS29.214, Policy and Charging Control (PCC) is implemented by virtue of an Rx reference point in the IMS. According to the description of the protocol, an Application Function (AF) provides session information for a PCRF network element, the session information is partially mapped from a Session Description Protocol (SDP) in SIP signalling into a related flow information Attribute Value Pair (AVP) in a Diameter Authorization Authentication Request (AAR) message according to the description of 3GPP TS29.213, and corresponding information is media flow information controlled by the PCRF. The AF corresponds to the P-CSCF in the IMS, the AVP refers to an attribute value pair specified in a Diameter protocol.

SIP Forking is a basic function of the IMS. SIP Forking refers to that multiple terminals share the same user number, and may use different bearers or have different capabilities; when the user number is a called user number, an IMS network searches for called user terminals in a parallel or serial selection manner, and a calling user selects one called user terminal for communication according to a certain strategy. In regardless of serial or parallel selection manner, a P-CSCF on a calling side needs to provide a PCRF with a media resource negotiated by the calling user and the selected called user terminal.

Figure 2:
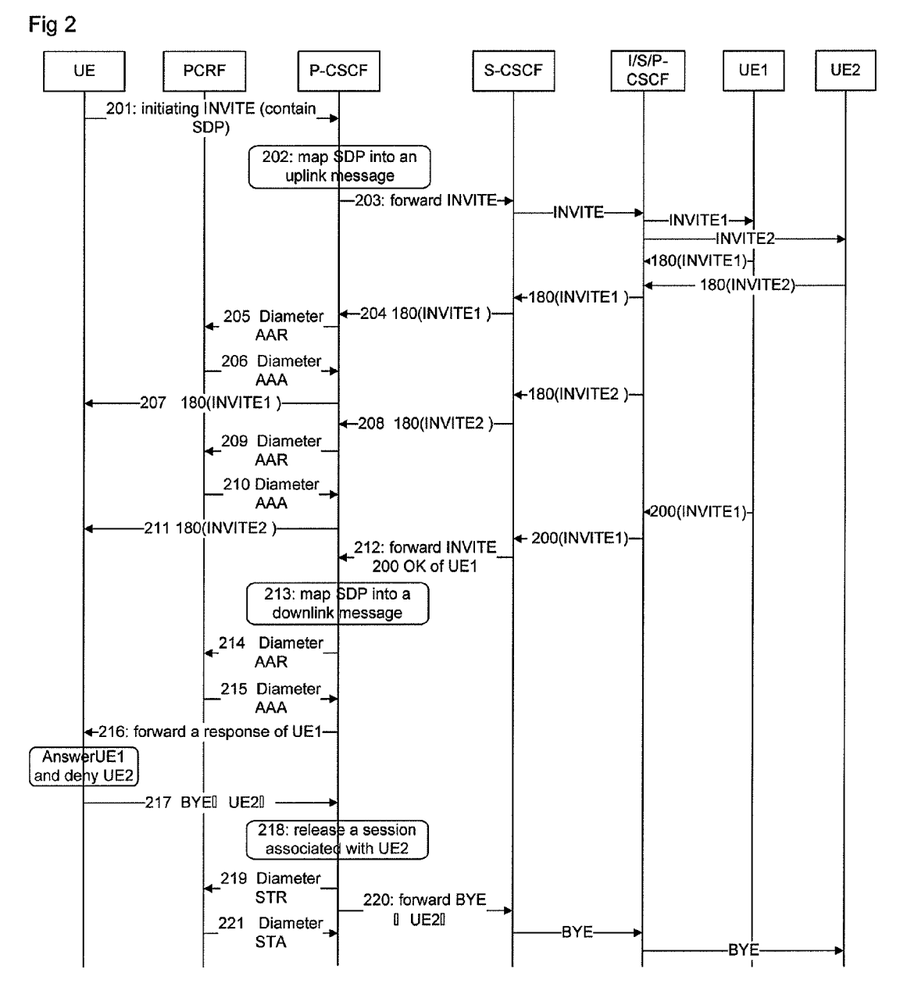
FIG. 2 is a flowchart of a method for bearer resource control under an SIP Forking scenario in a prior art.

In a current protocol, under an SIP Forking scenario, a flow of a QoS bearer resource control function on a calling side is shown in FIG. 2, and for example, if there are two paths, the flow includes the following steps that:

Step 201: a UE initiates a call, wherein an INVITE request message includes an SDP offer;

Step 202: when a P-CSCF receives the call, the P-CSCF maps the SDP offer into downlink media information;

Step 203: the P-CSCF forwards the INVITE request message to an S-CSCF, and the S-CSCF transmits the INVITE request to called UE;

Step 204-Step 211: a processing flow is implemented after the calling P-CSCF receives INVITE 180 requests from two terminals.

Here, for the calling P-CSCF, there are two paths of SIP sessions, wherein one path is an SIP session between a calling UE and UE1, and the other path is an SIP session between the calling UE and UE2. In Step 205, a Diameter session created between the P-CSCF and the PCRF is configured to transmit the Diameter AAR message corresponding to the first path in Step 205 and the Diameter AAR message corresponding to the second path in Step 209; an SIP-Forking-Indication AVP in the Diameter AAR message in Step 205 is SINGLE_DIALOGUE(0), and simultaneously contains media information negotiated by UE1; when receiving an INVITE 180 request from the second path, the P-CSCF can determine that Forking occurs at the called UEs, wherein the SIP-Forking-Indication AVP in the Diameter AAR message is SEVERAL_DIALOGUES(1), and simultaneously contains media information negotiated by UE2;

Step 212: the S-CSCF forwards to the P-CSCF an INVITE 200 OK response returned by the terminal on the first path, wherein the INVITE 200 OK response includes an SDP answer;

Step 213: when the P-CSCF receives the INVITE 200 OK response, the P-CSCF maps the SDP answer into uplink media information;

Step 214: the P-CSCF transmits the Diameter AAR message corresponding to the media negotiation between the calling UE and the called UE1 to the PCRF network element to request for resource authorization, wherein a Media-Component-Number AVP and a Flow-Number AVP are written into the Diameter AAR message to identify an IP Flow generated by combination of uplink and downlink media information, and the SIP-Forking-Indication AVP is written as SINGLE_DIALOGUE(0); wherein the IP Flow is a media resource negotiated by the calling UE and the selected called terminal;

Step 215: when the PCRF receives the SIP-Forking-Indication AVP which is SINGLE_DIALOGUE(0), or when the PCRF receives an AVP with no SIP-Forking-Indication AVP, a PCC rule is updated according to the media resource contained in the current Diameter AAR message, and meanwhile, a PCC rule unmatched with the IP Flow contained in the current Diameter AAR message is removed, that is, the PCC rule corresponding to the IP Flow negotiated by the calling UE and the called UE2 is removed, and a Diameter Authentication, Authorization and Accounting (AAA) response is transmitted to the P-CSCF;

Step 216: the P-CSCF forwards a session response to the calling UE;

Step 217: if a calling user selects to answer the terminal from the first path, the calling user needs to transmit a BYE request to remove the SIP session which has been established by the calling UE and UE2;

Step 218: the P-CSCF releases a session resource established by the calling UE and UE2;

Step 219: the P-CSCF transmits a Diameter Session Termination Request (STR) to the PCRF, and the PCRF may release a bearer resource which has been applied for; and Step 220: the P-CSCF forwards the BYE request.

It can be seen from the above flow that, in an SIP Forking scenario in the prior art, when the P-CSCF receives the first INVITE 200 OK, the SIP-Forking-Indication AVP in the Diameter AAR message is set as SINGLE_DIALOGUE(0), the PCRF confirms the bearer resource which was finally applied for according to the corresponding IP Flow in the Diameter AAA request corresponding to the INVITE 200 OK, and then deletes the PCC rule corresponding to the IP Flow negotiated by the calling UE and the called UE2, the P-CSCF receives the BYE request of removing the session with UE2, and transmits the Diameter STR message, wherein the Diameter STR message will release all the bearer resources which were applied for this call.

However, under the SIP Forking scenario, according to the protocol description of the supported RFC3261, the INVITE 200 OK messages from multiple called terminals are transparently transmitted to the calling user in media resource access negotiation regardless of in a serial or parallel manner, the calling user finally selects a proper called terminal to answer according to its own preference condition and a support request from equipment, the calling user has the right to select, the selected answering terminal is not always the terminal which is the first one returning the INVITE 200 OK, but in the prior art, the answering terminal selected by the calling user is always the terminal which is the first one returning the INVITE 200 OK; in addition, under the SIP Forking scenario, in a media resource releasing process, as long as one called terminal has returned a temporary response (for example, an INVITE message 183), while the answering object finally selected by the calling user is not this called terminal, it is necessary to transmit a BYE message to release the SIP session established with this called terminal, however, in the prior art, the calling P-CSCF would inform the PCRF to release all the bearer resources.

Thus it can be seen that the problems of the prior art are as follows: 1) the media resource negotiation under the condition that multiple called terminals return INVITE 200 OK is not supported in a media resource access negotiation process under the SIP Forking scenario; and 2) if the calling UE transmits a BYE message to release one path of SIP session in the media resource releasing process under the SIP Forking scenario, all the bearer resources which have been applied for the whole call will be released, and the normal bearer resources of the call on any path cannot be ensured, so that the normal communication of a basic call cannot be implemented.

In a word, QoS bearer resource control in the media resource access negotiation process and the media resource releasing process under the SIP Forking scenario cannot achieve normal call processing under the SIP Forking scenario.

SUMMARY

In view of this, one embodiments of the disclosure provide a method and system for QoS bearer resource control during access negotiation, which meet a requirement of a media resource access negotiation process under an SIP Forking scenario and support multimedia resource negotiation under the condition that multiple paths of called terminals return INVITE 200 OK.

Another embodiment of the disclosure provides a method and system for QoS bearer resource control during release, which support a media resource releasing process under an SIP Forking scenario and avoid the release of all the bearer resources.

To this end, the technical schemes of the embodiment of the disclosure are implemented as follows.

A method for QoS bearer resource control during access negotiation is provided, which includes that: during media resource access negotiation, a calling side network element receives an INVITE 200 OK message from a called side terminal, and only updates media resources negotiated by current session branch associated with the called side terminal when detecting that the call is under an SIP Forking scenario, and does not process resource bearers negotiated by other session branches.

The calling side network element may be a P-CSCF, and the method specifically includes that:

the P-CSCF receives the INVITE 200 OK message; and when the P-CSCF detects that the call is under the SIP Forking scenario and the other session branches besides the current session branch exist in the call, an SIP-Forking-Indication AVP in a Diameter AAR message is set as SEVERAL_DIALOGUES(1), and is transmitted to a PCRF; and the PCRF receives the Diameter AAR message from the P-CSCF, updates a PCC rule corresponding to an IP Flow, contained in the Diameter AAR message, of the current session branch, and does not process PCC rules corresponding to IP Flows, negotiated and acquired by virtue of the Diameter AAR message, of the other session branches.

A system for QoS bearer resource control during access negotiation is provided, which includes a called side terminal and a calling side network element, wherein the called side terminal is configured to transmit an INVITE 200 OK message to the calling side network element; and the calling side network element is configured to receive the INVITE 200 OK message from the called side terminal, and to, when detecting that the call is under an SIP Forking scenario, only update media resources negotiated by current session branch associated with the called side terminal, but not process resource bearers negotiated by other session branches.

The calling side network element may be a P-CSCF, and the system specifically includes a PCRF;

the P-CSCF is configured to, after receiving the INVITE 200 OK message and detecting that the call is under the SIP Forking scenario and the other session branches besides the current session branch exist in the call, set an SIP-Forking-Indication AVP in a Diameter AAR message to be SEVERAL_DIALOGUES(1), and transmit the SIP-Forking-Indication AVP to the PCRF; and the PCRF is configured to, after receiving the Diameter AAR message from the P-CSCF, update a PCC rule corresponding to an IP Flow, contained in the Diameter AAR message, of the current session branch, but not process PCC rules corresponding to IP Flows, negotiated and acquired by virtue of the Diameter AAR message, of the other session branches.

A method for QoS bearer resource control during release is provided, which includes that: during media resource release, a calling side network element receives a BYE message, and when detecting that this call is under an SIP Forking scenario, only releases media resources negotiated by current session branch, and does not process resource bearers negotiated by other session branches.

The calling side network element may be a P-CSCF, and the method further includes that: during negotiation by the current session branch of the call, a Diameter AAR message is used, an SIP-Forking-Indication AVP is set as SEVERAL_DIALOGUES(1), and an AVP attribute of an IP Flow is set as REMOVED.

The method may include that:

the P-CSCF receives the BYE message, and when the P-CSCF detects that the call is under the SIP Forking scenario and other session branches besides the current session branch exist in the call, the SIP-Forking-Indication AVP in the Diameter AAR message is set as SEVERAL_DIALOGUES(1), and is transmitted to a PCRF, wherein the Diameter AAR message also contains bearer resources corresponding to the IP Flow of the current session branch, and the AVP attribute of the IP Flow is set as REMOVED; and the PCRF receives the Diameter AAR message from the P-CSCF, and only releases the bearer resources corresponding to the IP Flow, set as REMOVED and contained in the Diameter AAR message, of the current session branch according to the AVP attribute of the IP Flow.

The calling side network element may be the P-CSCF, and the method further may include that: during negotiation by the current session branch of the call, an extended Diameter STR message is used, an SIP-Forking-Indication AVP is added to the extended Diameter STR message, and is set as SEVERAL_DIALOGUES(1), and the AVP attribute of the IP Flow is added to the extended Diameter STR message.

The method may include that:

the P-CSCF receives the BYE message, and when the P-CSCF detects that the call is under the SIP Forking scenario and the other session branches besides the current session branch exist in the call, the SIP-Forking-Indication AVP in the extended Diameter STR message is set as SEVERAL_DIALOGUES(1), and is transmitted to the PCRF, wherein the extended Diameter STR message also contains the bearer resources corresponding to the IP Flow of the current session branch, and the AVP attribute of the IP Flow is set as bearer resources corresponding to the current session branch; and the PCRF receives the extended Diameter STR message from the P-CSCF, and only releases the bearer resources corresponding to the IP Flow, contained in the Diameter AAR message, of the current session branch according to the AVP attribute of the IP Flow.

The calling side network element may be the P-CSCF, and the method further may include that any Diameter message is not transmitted.

The method may include that:

the P-CSCF receives the BYE message, and when the P-CSCF detects that the call is under the SIP Forking scenario and the other session branches besides the current session branch exist in the call, the P-CSCF does not transmit any Diameter message; and the PCRF does not receive any Diameter message, and does not release any bearer resource.

A system for QoS bearer resource control during release is provided, which includes a called side terminal and a calling side network element, wherein the called side terminal is configured to transmit a BYE message to the calling side network element, or receive a BYE message from the calling side network element; and the calling side network element is configured to, after receiving the BYE message, and detecting that this call is under an SIP Forking scenario, only release media resources negotiated by current session branch, but not process resource bearers negotiated by other session branches.

The calling side network element may be a P-CSCF, and the P-CSCF is further configured to use a Diameter AAR message during negotiation by the current session branch of the call, use an extended Diameter STR message during negotiation by the current session branch of the call, and not transmit any Diameter message for processing to determine the release of the media resources.

The P-CSCF may further set an SIP-Forking-Indication AVP in the Diameter AAR message to be SEVERAL_DIALOGUES(1) and transmit the SIP-Forking-Indication AVP to a PCRF when detecting that the call is under the SIP Forking scenario and the other session branches besides the current session branch exist in the call when the Diameter AAR message is used during negotiation by the current session branch of the call, wherein the Diameter AAR message also contains bearer resources corresponding to an IP Flow of the current session branch, and an AVP attribute of the IP Flow is set as REMOVED; and the system further includes the PCRF, which is configured to receive the Diameter AAR message from the P-CSCF and only release the bearer resources corresponding to the IP Flow, set as REMOVED and contained in the Diameter AAR message, of the current session branch according to the AVP attribute of the IP Flow.

The P-CSCF may further set an SIP-Forking-Indication AVP in the extended Diameter STR message to be SEVERAL_DIALOGUES(1) and transmit the SIP-Forking-Indication AVP to the PCRF when detecting that the call is under the SIP Forking scenario and the other session branches besides the current session branch exist in the call when the extended Diameter STR message is used during negotiation by the current session branch of the call, wherein the extended Diameter STR message also contains bearer resources corresponding to the IP Flow of the current session branch, and the AVP attribute of the IP Flow is set as bearer resources corresponding to the current session branch; and the system further includes the PCRF, which is configured to receive the extended Diameter STR message from the P-CSCF and only release the bearer resources corresponding to the IP Flow, contained in the Diameter STR message, of the current session branch according to the AVP attribute of the IP Flow.

In an embodiment, the P-CSCF does not transmit any Diameter message to the PCRF when detecting that the call is under the SIP Forking scenario and the other session branches besides the current session branch exist in the call in a case where no Diameter message is transmitted for processing; and the system further includes the PCRF, further configured to not receive any Diameter message and not release any bearer resource.

According to the embodiment of the disclosure, during media resource access negotiation, the calling side network element receives a INVITE 200 OK message from the called side terminal, and when detecting that the call is under the SIP Forking scenario, only updates the media resources negotiated by the current session branch, and does not process the resource bearers negotiated by the other session branches. With the adoption of the embodiment of the disclosure, a resource bearer requirement under the SIP Forking scenario during media resource access negotiation can be met.

According to the embodiment of the disclosure, during media resource release, the calling side network element receives a BYE message, and when detecting that the call is under the SIP Forking scenario, only releases the media resources negotiated by the current session branch, and does not process the resource bearers negotiated by the other session branches. With the adoption of the embodiment of the disclosure, a resource bearer requirement under the SIP Forking scenario during media resource release can be met.

DETAILED DESCRIPTION

In the embodiments of the disclosure, during media resource access negotiation, a calling side network element receives an INVITE 200 OK message from a called side terminal, and when detecting that this call is under an SIP Forking scenario, the calling side network element only updates media resources negotiated by current session branch associated with the called side terminal, and does not process resource bearers negotiated by other session branches. During media resource release, the calling side network element receives a BYE message, and when detecting that call is under the SIP Forking scenario, only releases the media resources negotiated by the current session branch, and does not process the resource bearers negotiated by the other session branches.

According to a current protocol, it is unclear about the processing of bearers of the INVITE 200 from the second path under the SIP Forking scenario, but it is clear that the INVITE 200 OK from the first path may delete the result of a media negotiation of the second path, as a result, the INVITE 200 OK from the second path fails in application for corresponding media resources, or the media resources of the second path may cover media resources of the first path which have been applied for. In a word, the current protocol is not adapted to QoS bearer resource control under the SIP Forking scenario, no matter in a media resource access negotiation process or a media resource releasing process. Therefore, the embodiments of the disclosure include two schemes, wherein scheme 1 is directed to QoS bearer resource control in a media resource access negotiation process, and scheme 2 is directed to QoS bearer resource control in a media resource releasing process. Schemes 1 and 2 are described blow respectively.

Scheme 1 is that, during media resource access negotiation, a calling side network element receives an INVITE 200 OK message from a called side terminal, and when detecting that this call is under the SIP Forking scenario, the calling side network element only updates the media resources negotiated by the current session branch associated with the called side user, and does not process the resource bearers negotiated by other session branches. Problem 1 caused by the prior art can be solved. For the media resource access negotiation process under the SIP Forking scenario, media resource negotiation is supported when called terminals from multiple paths respectively return INVITE 200 OK messages, and a calling terminal can select a proper called terminal for call according to the preference of the calling terminal.

A method for QoS bearer resource control during access negotiation includes the following steps that:

a) a calling P-CSCF, when receiving INVITE 200 OK, sets an SIP-Forking-Indication AVP in a Diameter AAR message to be SEVERAL_DIALOGUES(1) and transmits the Diameter AAR message to a PCRF when the calling P-CSCF detects that this call is under an SIP Forking scenario and other related sessions also exist in this call besides a session associated with a terminal who sent the INVITE 200 OK.

b) The PCRF receives the Diameter AAR message from the P-CSCF, updates a PCC rule corresponding an IP Flow, contained in the Diameter AAR message, of the terminal, and does not perform any processing (including deletion and updating) on PCC rules corresponding to IP Flows, negotiated and acquired by virtue of the Diameter AAR message, of other terminals, so that media resources applied by each terminal can be ensured to be maintained.

Here, the embodiment of the disclosure differs from the prior art in a way that the SIP-Forking-Indication AVP in the INVITE 200 OK is set as SEVERAL-DIALOGUES(1), so that the PCRF does not process bearer resources and PCC rules corresponding to the IP Flows of the other terminals on other paths, while in the prior art, the SIP-Forking-Indication AVP in the INVITE 200 OK is set as SINGLE-DIALOGUE (0), so that the PCRF removes the PCC rules corresponding to the IP Flows of the terminals on the other paths.

A system for QoS bearer resource control during access negotiation includes a called side terminal and a calling side network element, wherein the called side terminal is configured to transmit an INVITE 200 OK message to the calling side network element; and the calling side network element is configured to receive the INVITE 200 OK message from the called side terminal, and to, when detecting that this call is under an SIP Forking scenario, only update media resources negotiated by current session branch associated with the called side terminal, but not process resource bearers negotiated by other session branches.

Here, the calling side network element may be a P-CSCF, and the system further includes a PCRF;

the P-CSCF is configured to, after receiving the INVITE 200 OK message, set an SIP-Forking-Indication AVP in a Diameter AAR message to be SEVERAL_DIALOGUES(1) when detecting that the call is under the SIP Forking scenario and the other session branches besides the current session branch exist in the call, and to transmit the SIP-Forking-Indication AVP to the PCRF; and the PCRF is configured to, after receiving the Diameter AAR message from the P-CSCF, update a PCC rule corresponding to an IP Flow, contained in the Diameter AAR message, of the current session branch, but not process PCC rules corresponding to IP Flows, negotiated and acquired by virtue of the Diameter AAR message, of the other session branches.

Scheme 2 is that during media resource release, a calling side network element receives a BYE message, and when detecting that this call is under an SIP Forking scenario, only releases media resources negotiated by current session branch, and does not process resource bearers negotiated by other session branches. Problem 2 caused by the prior art can be solved. For a media resource releasing process under an SIP Forking scenario, when a calling terminal transmits the BYE message to release one of SIP sessions, a normal processing can be performed at the call media surface when the signalling surface can intercommunicate.

There are three solutions for a method for QoS bearer resource control during release.

Solution 1 includes the following steps that:

(a) a calling P-CSCF transmits a Diameter AAR message to a PCRF when receiving a BYE message and detecting that this call is under an SIP Forking scenario and other related sessions exist in this call besides a session associated with a terminal which sent the BYE message; and a conventional Diameter AAR message has an SIP-Forking-Indication AVP field, so that the SIP-Forking-Indication AVP in the Diameter AAR message is directly set as SEVERAL_DIALOGUES(1), wherein an IP Flow negotiated by the session corresponding to the current BYE message is contained in the Diameter AAR message, and a Flow-Status AVP in a Media-Component-Description AVP corresponding to the IP Flow is set as REMOVED;

here, transmitting by the P-CSCF the AAR message containing the IP Flow which corresponds to the Flow-Status AVP set as REMOVED after the P-CSCF receives the BYE message means releasing bearer resources specified in the call, which differs from the prior art in which transmitting an STR message means releasing all bearer resources of the whole call after a BYE message is received;

(b) the PCRF receives the Diameter AAR message from the P-CSCF, only removes bearer resources and a PCC rule corresponding to the IP Flow contained in the Diameter AAR message, and does not process IP Flows outside the Diameter AAR message.

Solution 2 includes the following steps that:

(a) a Diameter STR message is extended: an optional SIP-Forking-Indication AVP field and a Flows AVP field are added, wherein a Flows AVP represents a number corresponding to an IP Flow to be deleted;

when a calling P-CSCF receives a BYE message, and when detecting that this call is under an SIP Forking scenario and other session exist in this call besides a session associated with a terminal which sent the BYE message, a Diameter message transmitted to a PCRF is the Diameter STR message, and the current Diameter STR message does not have the SIP-Forking-Indication AVP field and the Flows VAP field, so that the current Diameter STR message is extended, the SIP-Forking-Indication AVP field is added, the SIP-Forking-Indication AVP is set as SEVERAL_DIALOGUES(1), and the SIP-Forking-Indication AVP is for identifying that only session bearer resources corresponding to the Flows AVP in the STR message need to be released, wherein the Flows AVP is the bearer resource corresponding to the session associated with the terminal which sent the BYE message.

It is necessary to point out that if there is no other session exist in this call except the session associated with the terminal which sent the BYE message although it is detected that this call is under the SIP Forking scenario when the calling P-CSCF receives the BYE message, that is, if there is only one SIP session, the P-CSCF transmits a Diameter STR message to the PCRF, like a conventional protocol. If the Diameter STR message is an extended message, that is, if the SIP-Forking-Indication AVP field is added, the SIP-Forking-Indication AVP contained in the Diameter STR message is set as SINGLE_DIALOGUE(0); and if the Diameter STR message is not an extended message, the Diameter STR message does not carry the SIP-Forking-Indication AVP;

here, in step (a), the AVP may be extended to indicate SIP Forking in the Diameter STR message transmitted by the P-CSCF; or an AF network element extends another Diameter message to indicate SIP Forking;

(b) the PCRF receives the Diameter STR message from the P-CSCF, and only releases bearers corresponding to the Flows AVP if it is found that the SIP-Forking-Indication AVP is SEVERAL_DIALOGUES(1); and if there is no SIP-Forking-Indication AVP or the SIP-Forking-Indication AVP is SINGLE_DIALOGUE(0), all associated bearer resources under the Diameter session are released.

Solution 3 includes the following steps that:

(a) a calling P-CSCF does not transmit any Diameter message when receiving a BYE message and when detecting that this call is under an SIP Forking scenario and other related sessions exist in this call besides a session associated with a terminal which sent the BYE message; and (b) a PCRF will not receive any Diameter message, and accordingly not release any bearer resource.

Furthermore, the solutions of the embodiment of the disclosure are not limited to QoS bearer resource control at an Rx interface, and the principle of the embodiment of the disclosure is also applied to the QoS bearer resource control at a Gq' interface. The solutions of the embodiment of the disclosure are not limited to the P-CSCF, and moreover, the principle of the embodiment of the disclosure is also applied to an Access Gateway Control Function (AGCF) in an IMS system and AF network elements adopting the Rx interface and the Gq' interface.

From the above, compared with the prior art, the disclosure has the advantages that when called terminals are under a SIP Forking situation in a QoS bearer resource control process of an IMS system, a calling P-CSCF changes a field value of a Diameter AAR message when receiving INCITE 200 OK in scheme 1; in solution 1 of the scheme 2, the Diameter AAR message is used when the BYE message is received and one branch of the call is deleted; in solution 2 of the scheme 2, the Diameter STR message is extended when the BYE message is received and one branch of the call is deleted; for solution 3 of scheme 2, the calling P-CSCF does not transmit any Diameter message when the BYE message is received and one branch of the call is deleted; therefore, UE accessing an IMS network can autonomously select a called terminal for QoS bearer resource control according to the preference of the calling terminal, a normal call can be made when called terminals are under the SIP Forking situation, the system QoS capability is improved, and a user experience is improved.

A system for QoS bearer resource control during release includes a called side terminal and a calling side network element, wherein the called side terminal is configured to transmit a BYE message to the calling side network element, or to receive a BYE message from the calling side network element; and the calling side network element is configured to, after receiving the BYE message, if it is detected that this call is under an SIP Forking scenario, only release media resources negotiated by current session branch associated with the called side terminal, but not process resource bearers negotiated by other session branches.

Here, the calling side network element may be a P-CSCF, and is further configured to use a Diameter AAR message during negotiation by the current session branch of the call, use an extended Diameter STR message during negotiation by the current session branch of the call, and not transmit any Diameter message for processing to determine the release of the media resources.

Here, the P-CSCF further sets an SIP-Forking-Indication AVP in the Diameter AAR message to be SEVERAL_DIALOGUES(1) and transmits the SIP-Forking-Indication AVP to a PCRF if it is detected that the call is under the SIP Forking scenario and the other session branches besides the current session branch exist in the call when the Diameter AAR message is used during negotiation by the current session branch of the call, wherein the Diameter AAR message also contains bearer resources corresponding to an IP Flow of the current session branch, and an AVP attribute of the IP Flow is set as REMOVED; and the system further includes the PCRF, which is configured to receive the Diameter AAR message from the P-CSCF and only release the bearer resources corresponding to the IP Flow, set as REMOVED and contained in the Diameter AAR message, of the current session branch according to the AVP attribute of the IP Flow.

Here, the P-CSCF further sets an SIP-Forking-Indication AVP in the extended Diameter STR message to be SEVERAL_DIALOGUES(1) and transmits the SIP-Forking-Indication AVP to the PCRF if it is detected that the call is under the SIP Forking scenario and the other session branches besides the current session branch exist in the call when the extended Diameter STR message is used during negotiation by the current session branch of the call, wherein the extended Diameter STR message also contains bearer resources corresponding to the IP Flow of the current session branch, and the Flows AVP is set as bearer resources corresponding to the current session branch; and the system further includes the PCRF, which is configured to receive the extended Diameter STR message from the P-CSCF and only release the bearer resources corresponding to the Flows AVP, contained in the Diameter STR message, of the current session branch.

Here, the P-CSCF does not transmit any Diameter message to the PCRF if it is detected that the call is under the SIP Forking scenario and the other session branches besides the current session branch exist in the call when no Diameter message is transmitted for processing; and the system further includes the PCRF, which is further configured to not receive any Diameter message or release any bearer resource.

The implementation of the technical schemes is further described below with reference to the drawings in detail.

Figure 3:
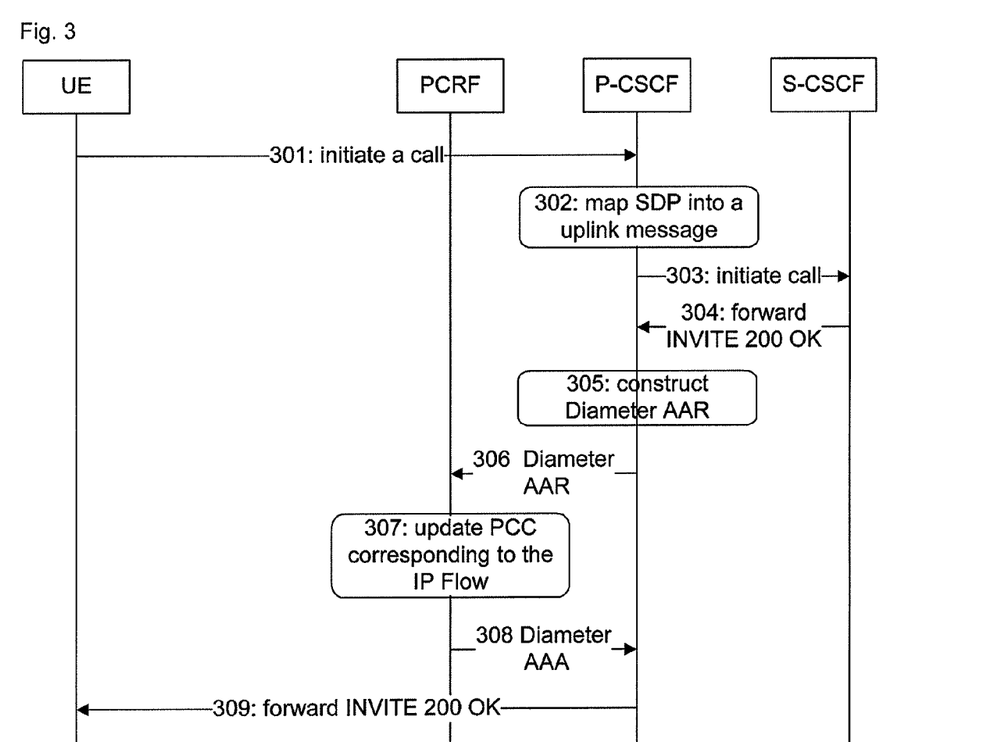
FIG. 3 is a flowchart of a method for QoS bearer resource control according to embodiment 1 corresponding to scheme 1 of the disclosure.

Embodiment 1 corresponding to scheme 1:

FIG. 3 is a bearer control flow of embodiment 1 corresponding to scheme 1, which is mainly a processing process after a calling P-CSCF receives INVITE 200 OK, wherein a processing flow before the INVITE 200 OK is eliminated, the same as that shown in FIG. 2 in the prior art, and it will not be repeated here. The flow of embodiment 1 includes the following steps that:

Step 301: UE initiates a call;

Step 302: a P-CSCF of a visited network maps SDP information into downlink media information after receiving a call request containing an SDP offer;

Step 303: the calling P-CSCF forwards the SDP offer request to an S-CSCF, and the S-CSCF transmits the SDP offer request to a called side;

Step 304: a calling S-SCSF forwards an INVITE 200 OK message of SDP answer transmitted by the called side;

Step 305: the calling P-CSCF constructs a Diameter AAR message in combination with downlink connection information acquired in Step 302 when determining that called terminals are under SIP Forking based on the reception of multiple temporary responses (for example, INVITE 180 or 183) to this call in an early stage, wherein an SIP-Forking-Indication AVP is set as SEVERAL_DIALOGUES(1), which is different from the SIP-Forking-Indication AVP in an ordinary call in which it is set as SINGLE_DIALOGUE (0);

Step 306: the calling P-CSCF transmits session information to a PCRF network element by virtue of the Diameter AAR message;

Step 307: the PCRF receives a bearer request, i.e. a Diameter AAA message, and generates and transmits an additional PCC rule to a gateway if it is found that the value of the SIP-Forking-Indication AVP is SEVERAL_DIALOGUES(1);

Step 308: the PCRF returns a bearer resource control result, and transmits a Diameter AAA response to the P-CSCF; and Step 309: the P-CSCF forwards a call response to the calling side UE.

The flow only describes the processing of the calling P-CSCF after the reception of the first INVITE 200 OK, and the subsequent reception of multiple INVITE 200 OK is processed in the same manner.

Figure 4:
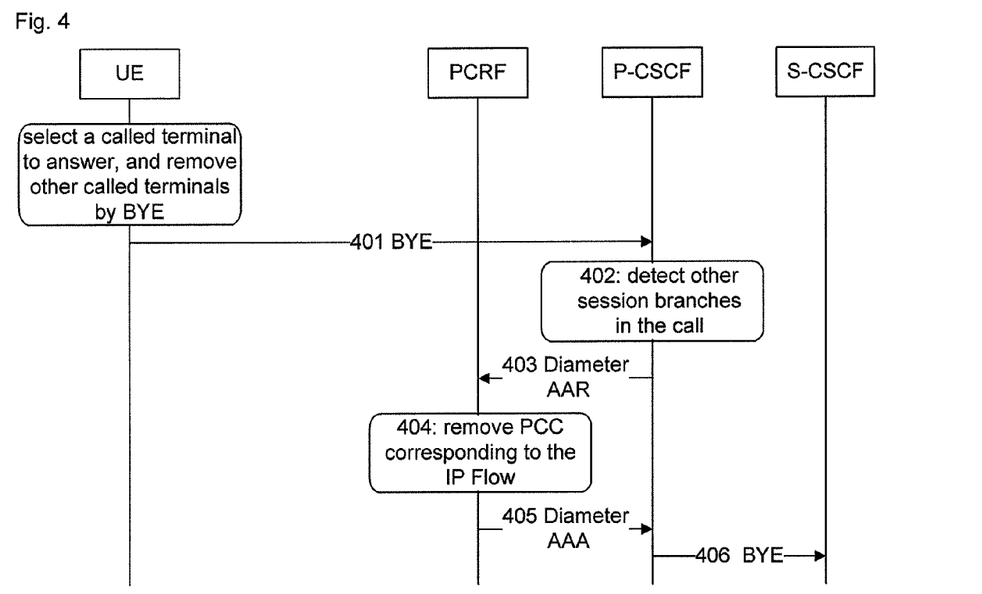
FIG. 4 is a flowchart of a method for QoS bearer resource control according to embodiment 1 corresponding to scheme 2 of the disclosure.

Embodiment 1 corresponding to scheme 2:

FIG. 4 is a bearer control flow of embodiment 1 corresponding to scheme 2, which is mainly a processing process after a calling P-CSCF receives a BYE message, wherein a process of call establishment under an SIP Forking scenario is eliminated. The embodiment describes that a calling UE selects one branch of the call to answer and transmits BYE messages to other established or un-established SIP sessions, and the flow of embodiment 1 includes the following steps that:

Step 401: the calling P-CSCF receives from a terminal a BYE message of releasing a call;

Step 402: if it is found that only one SIP session exists in the call, the P-CSCF releases an associated Diameter session by adopting a Diameter STR message specified by a protocol; and if there are multiple SIP sessions existing in the call, the current BYE message is employed to release only one session, and the P-CSCF finds media information negotiated by the session, sets a Flow-Status AVP corresponding to an IP Flow to be REMOVED(4), and simultaneously sets the SIP-Forking-Indication AVP to be SEVERAL_DIALOGUES(1) to construct a Diameter AAA message;

Step 403: the P-CSCF transmits the Diameter AAA message;

Step 404: a PCRF receives a bearer request, i.e. the Diameter AAA message, finds that the value of the SIP-Forking-Indication AVP is SEVERAL_DIALOGUES(1), and deletes all the IP Flows related to the Flow-Status AVPs which are set as REMOVED;

Step 405: the PCRF returns the Diameter AAA message; and

Step 406: the P-CSCF releases SIP session resources associated with this session branch, and forwards the BYE message.

Figure 5:
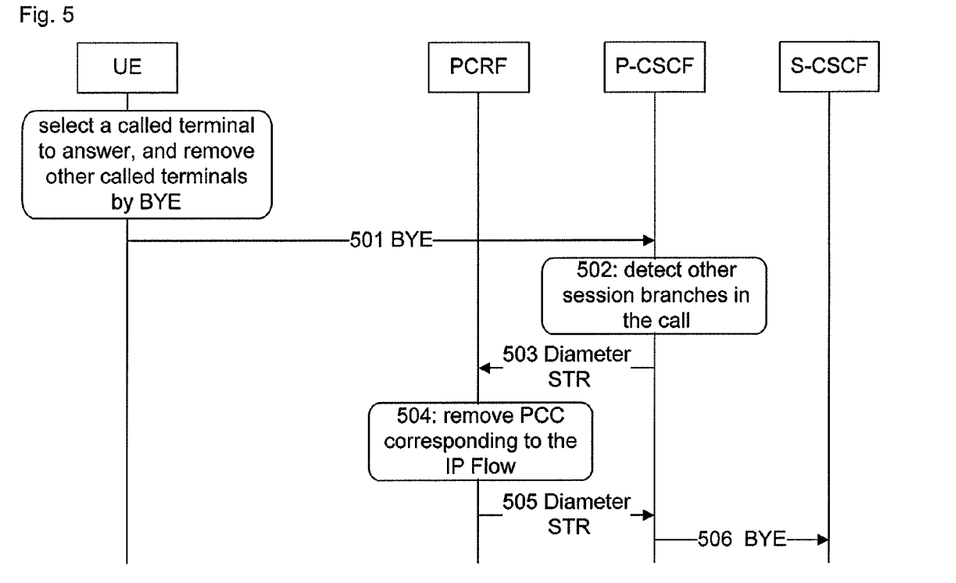
FIG. 5 is a flowchart of a method for QoS bearer resource control according to embodiment 2 corresponding to scheme 2 of the disclosure.

Embodiment 2 corresponding to scheme 2:

FIG. 5 is a bearer control flow of embodiment 2 corresponding to scheme 2, which is mainly a processing process after a calling P-CSCF receives a BYE message, wherein a process of call establishment under an SIP Forking scenario is eliminated. The embodiment describes that a calling UE selects one branch of the call to answer and transmits BYE messages to other established or un-established SIP sessions, and the flow of embodiment 2 includes the following steps that:

Step 501: the calling P-CSCF receives from a terminal a BYE message of releasing a call;

Step 502: if it is found that only one SIP session exists in the call, the P-CSCF releases an associated Diameter session by adopting a Diameter STR message specified by a protocol; and if there are multiple SIP sessions existing in the call, the current BYE message is employed to release only one session, and the P-CSCF finds media information negotiated by the session, constructs a Diameter STR message, writes a Flows AVP corresponding to the session, and simultaneously sets an SIP-Forking-Indication AVP as SEVERAL_DIALOGUES(1) for indicating releasing one SIP session under the SIP Forking scenario;

Step 503: the P-CSCF transmits the Diameter STR message;

Step 504: a PCRF receives a bearer request, i.e. the Diameter STR message, finds that the value of the SIP-Forking-Indication AVP is SEVERAL_DIALOGUES(1), and only releases bearer resources indicated by a Flow AVP;

Step 505: the PCRF returns the Diameter STR message; and

Step 506: the P-CSCF releases SIP session resources associated with the session, and forwards the BYE message.

Figure 6:
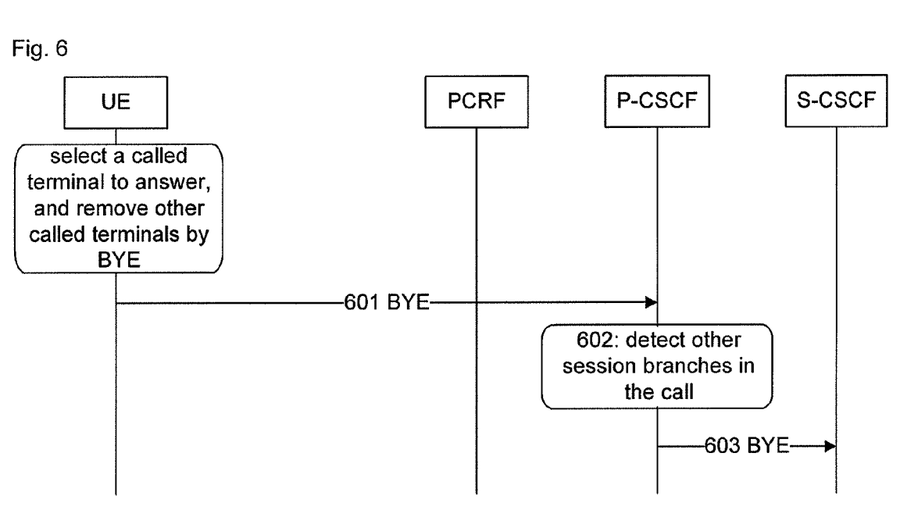
FIG. 6 is a flowchart of a method for QoS bearer resource control according to embodiment 3 corresponding to scheme 2 of the disclosure.

Embodiment 3 corresponding to scheme 2:

FIG. 6 is a bearer control flow of embodiment 3 corresponding to scheme 2, which is mainly a processing process after a calling P-CSCF receives a BYE message, wherein a process of call establishment under an SIP Forking scenario is eliminated. The embodiment describes that a calling UE selects one branch of the call to answer and transmits BYE messages to other established or un-established SIP sessions, and the flow of embodiment 3 includes the following steps that:

Step 601: the calling P-CSCF receives from a terminal a BYE message of releasing a call;

Step 602: if it is found that only one SIP session exists in the call, the P-CSCF releases an associated Diameter session using a Diameter STR message specified in a protocol; and if there are multiple SIP sessions existing in the call, the current BYE message is employed to release only one session, and does not transmit any Diameter message to a PCRF; and Step 603: the P-CSCF releases SIP session resources associated with the current SIP session, and forwards the BYE message.

Here, by comparison between the prior art and the embodiment of the disclosure, it can be seen that: in the prior art, according to the conventional 3GPP29.214 protocol, the calling P-CSCF changes an identifier indicating SIP Forking from SEVERAL_DIALOGUES into SINGLE_DIALOGUE when receiving the first INVITE 200 OK, and then the PCRF only reserves bearer resources negotiated by the first INVITE 200 OK, and deletes bottom-layer bearer resources of the other branches, as a result, the right of a user to autonomously select an answering object is deprived. Moreover, as to a situation where the calling P-CSCF receives a BYE message, there are two different processing manners, one is releasing all the SIP session bearer resources and another is releasing the bearer resources corresponding to one only SIP session, however, the current protocol does not distinguish the two manners, which adopts the conventional Diameter STR message for releasing in a unified manner, so that the media surfaces between the calling and called sides cannot intercommunicate although signalling surfaces therebetween can intercommunicate under the Forking condition, and the call cannot be continuously made.

While in the embodiments of the disclosure, the processing flows after the P-CSCF receives the INVITE 200 OK and the BYE message are improved, and when the INVITE 200 OK is received, only bearers negotiated by the current session branch are updated, and bottom-layer bearers negotiated by the other session branches are will not be processed, and meanwhile, when the BYE message is received, only the bearer resources negotiated by this session branch are released, and the other session branches will not be processed; therefore, the user has the right for autonomous selection.

From the above, according to the embodiments of the disclosure, when multiple called terminals are answered when the called terminals are under an SIP Forking scenario in the IMS, QoS bearer resource control under the SIP Forking scenario in the IMS is fulfilled by optimizing the network processing flows and extending the fields in the messages.

The above are only the embodiments of the disclosure but not intended to limit the scope of protection of the disclosure.

INDUSTRIAL APPLICABILITY

According to the embodiments of the disclosure, during media resource release, a calling side network element receives a BYE message, and when detecting that this call is under the SIP Forking scenario, only releases media resources negotiated by the current session branch, and does not process the resource bearers negotiated by the other session branches. By the embodiments of the disclosure, the resource bearer requirements in the SIP Forking scenario during media resource release can be met.

What is claimed is:

1. A method for Quality of Service (QoS) bearer resource control during access negotiation, comprising:
   receiving, by a calling side network element, an INVITE 200 OK message from a called side terminal, and when detecting that the call is under a Session Initiation Protocol (SIP) Forking scenario, only updating media resources negotiated by current session branch associated with the called side terminal, but not processing resource bearers negotiated by other session branches, during media resource access negotiation.

2. The method according to claim 1, wherein the calling side network element is a Proxy Call Session Control Function (P-CSCF), and the method comprises:
   receiving, by the P-CSCF, the INVITE 200 OK message; when the P-CSCF detects that the call is under the SIP Forking scenario and that other session branches besides the current session branch exist in the call, setting, by the P-CSCF, an SIP-Forking-Indication Attribute Value Pair (AVP) in a Diameter Authorization Authentication Request (AAR) message to be SEVERAL_DIALOGUES(1), and transmitting the Diameter AAR message to a Policy and Charging Rule Function (PCRF); and receiving, by the PCRF, the Diameter AAR message from the P-CSCF, updating a Policy and Charging Control (PCC) rule corresponding to an Internet Protocol (IP) Flow, contained in the Diameter AAR message, of the current session branch, but not processing PCC rules corresponding to IP Flows, negotiated and acquired by virtue of the Diameter AAR message, of the other session branches.

3. A system for Quality of Service (QoS) bearer resource control during access negotiation, comprising a called side terminal and a calling side network element, wherein
the called side terminal is configured to transmit an INVITE 200 OK message to the calling side network element; and
the calling side network element is configured to receive the INVITE 200 OK message from the called side terminal, and to, when detecting that the call is under a Session Initiation Protocol (SIP) Forking scenario, only update media resources negotiated by current session branch associated with the called side terminal, but not process resource bearers negotiated by other session branches.

4. The system according to claim 3, wherein the calling side network element is a Proxy Call Session Control Function (P-CSCF), and the system further comprises a Policy and Charging Rule Function (PCRF);
the P-CSCF is configured to, after receiving the INVITE 200 OK message and when detecting that call is under the SIP Forking scenario and that other session branches besides the current session branch exist in the call, set an SIP-Forking-Indication Attribute Value Pair (AVP) in a Diameter Authorization Authentication Request (AAR) message to be SEVERAL_DIALOGUES(1), and transmit the Diameter AAR message to the PCRF; and
the PCRF is configured to, after receiving the Diameter AAR message from the P-CSCF, update a Policy and Charging Control (PCC) rule corresponding to an Internet Protocol (IP) Flow, contained in the Diameter AAR message, of the current session branch, but not process PCC rules corresponding to IP Flows, negotiated and acquired by virtue of the Diameter AAR message, of the other session branches.

5. A method for Quality of Service (QoS) bearer resource control during release, comprising:
receiving, by a calling side network element, a BYE message, and when detecting that the call is under a Session Initiation Protocol (SIP) Forking scenario, only releasing media resources negotiated by current session branch, but not processing resource bearers negotiated by other session branches, during media resource release.

6. The method according to claim 5, wherein the calling side network element is a Proxy Call Session Control Function (P-CSCF), and the method further comprises:
using a Diameter Authorization Authentication Request (AAR) message, setting an SIP-Forking-Indication Attribute Value Pair (AVP) to be SEVERAL_DIALOGUES(1), and setting an AVP attribute of an Internet Protocol (IP) Flow to be REMOVED, during the negotiation by the current session branch of the call.

7. The method according to claim 6, comprising:
receiving, by the P-CSCF, the BYE message; and when detecting that the call is under the SIP Forking scenario and that other session branches besides the current session branch exist in the call, setting the SIP-Forking-Indication AVP in the Diameter AAR message to be SEVERAL_DIALOGUES(1), and transmitting the Diameter AAR message to a Policy and Charging Rule Function (PCRF), wherein the Diameter AAR message also contains bearer resources corresponding to the IP Flow of the current session branch, and the AVP attribute of the IP Flow is set as REMOVED; and
receiving, by the PCRF, the Diameter AAR message from the P-CSCF, and only releasing the bearer resources corresponding to the IP Flow, set as REMOVED and contained in the Diameter AAR message, of the current session branch according to the AVP attribute of the IP Flow.

8. The method according to claim 5, wherein the calling side network element is a P-CSCF, and the method further comprises: using an extended Diameter STR message, adding an SIP-Forking-Indication AVP to the extended Diameter STR message, setting the SIP-Forking-Indication AVP to be SEVERAL_DIALOGUES(1), and adding an AVP attribute of an IP Flow to the extended Diameter STR message, during the negotiation by the current session branch of the call.

9. The method according to claim 8, comprising:
receiving, by the P-CSCF, the BYE message; and when detecting that the call is under the SIP Forking scenario and that other session branches besides the current session branch exist in the call, setting the SIP-Forking-Indication AVP in the extended Diameter STR message to be SEVERAL_DIALOGUES(1), and transmitting the Diameter AAR message to a PCRF, wherein the extended Diameter STR message also contains bearer resources corresponding to the IP Flow of the current session branch, and the AVP attribute of the IP Flow is set as bearer resources corresponding to the current session branch; and
receiving, by the PCRF, the extended Diameter STR message from the P-CSCF, and only releasing the bearer resources corresponding to the IP Flow, contained in the Diameter AAR message, of the current session branch according to the AVP attribute of the IP Flow.

10. The method according to claim 5, wherein the calling side network element is a P-CSCF, and the method further comprises: not transmitting any Diameter message.

11. The method according to claim 10, specifically comprising:
receiving, by the P-CSCF, the BYE message; and when detecting that call is under the SIP Forking scenario and that other session branches besides the current session branch exist in the call, not transmitting any Diameter message; and
not receiving, by the PCRF, any Diameter message, and not releasing any bearer resource.

12. A system for Quality of Service (QoS) bearer resource control during release, comprising a called side terminal and a calling side network element, wherein
the called side terminal is configured to transmit a BYE message to the calling side network element, or receive a BYE message from the calling side network element; and
the calling side network element is configured to, after receiving the BYE message and when detecting that the call is under a Session Initiation Protocol (SIP) Forking scenario, only release media resources negotiated by current session branch associated with the called side terminal, but not process resource bearers negotiated by other session branches.

13. The system according to claim 12, wherein the calling side network element is a Proxy Call Session Control Function (P-CSCF), and is further configured to use a Diameter Authorization Authentication Request (AAR) message during the negotiation by the current session branch of the call, to use an extended Diameter Session Termination Request (STR) message during the negotiation by the current session branch of the call, and to not transmit any Diameter message for processing to determine the release of the media resources.

14. The system according to claim 13, wherein the P-CSCF is further configured to set an SIP-Forking-Indication Attribute Value Pair (AVP) in the Diameter AAR message to be SEVERAL_DIALOGUES(1), and to transmit the Diameter AAR message to a Policy and Charging Rule Function (PCRF) when detecting that the call is under the SIP Forking scenario and that other session branches besides the current session branch exist in the call when the Diameter AAR message is used during the negotiation by the current session branch of the call, wherein the Diameter AAR message also contains bearer resources corresponding to an Internet Protocol (IP) Flow of the current session branch, and an AVP attribute of the IP Flow is set as REMOVED; and     the system further comprises the PCRF, wherein the PCRF is configured to receive the Diameter AAR message from the P-CSCF and to only release the bearer resources corresponding to the IP Flow, set as REMOVED and contained in the Diameter AAR message, of the current session branch according to the AVP attribute of the IP Flow.

15. The system according to claim 13, wherein the P-CSCF is further configured to set an SIP-Forking-Indication AVP in the extended Diameter STR message to be SEVERAL_DIALOGUES(1), and to transmit the extended Diameter STR message to a PCRF when detecting that the call is under the SIP Forking scenario and that other session branches besides the current session branch exist in the call when the extended Diameter STR message is used during the negotiation by the current session branch of the call, wherein the extended Diameter STR message also contains bearer resources corresponding to the IP Flow of the current session branch, and the AVP attribute of the IP Flow is set as bearer resources corresponding to the current session branch; and     the system further comprises the PCRF, wherein the PCRF is configured to receive the extended Diameter STR message from the P-CSCF and to only release the bearer resources corresponding to the IP Flow, contained in the Diameter STR message, of the current session branch according to the AVP attribute of the IP Flow.

16. The system according to claim 13, wherein the P-CSCF is configured to not transmit any Diameter message to a PCRF when detecting that the call is under the SIP Forking scenario and that other session branches besides the current session branch exist in the call, as to a case where no Diameter message is not transmitted for processing; and     the system further comprises the PCRF, wherein the PCRF is further configured to not receive any Diameter message and not release any bearer resource.

* * * * *